S. O. CAMPBELL.

Improvement in Car Coupling.

No. 4,716. Reissued Jan. 23, 1872.

Witnesses.
E. H. Bates
F. B. Curtis.

Inventor.
Solon O. Campbell,
Chipman & Somer & Co,
Attys.

AM. PHOTO-LITHOGRAPHIC CO. N.Y. (OSBORNE'S PROCESS.)

UNITED STATES PATENT OFFICE.

SOLON OWEN CAMPBELL, OF CENTRE TOWN, MISSOURI.

IMPROVEMENT IN CAR-COUPLINGS.

Specification forming part of Letters Patent No. 97,876, dated December 14, 1869; reissue No. 4,716, dated January 23, 1872.

Be it known that I, SOLON OWEN CAMPBELL, of Centre Town, in the county of Cole and State of Missouri, have invented a new, useful, and valuable Improvement in Car-Couplings; and I do hereby declare that the following is a full, clear, and exact description of the construction and operation of the same, reference being had to the annexed drawing making a part of this annexed specification, in which—

Figure 1:
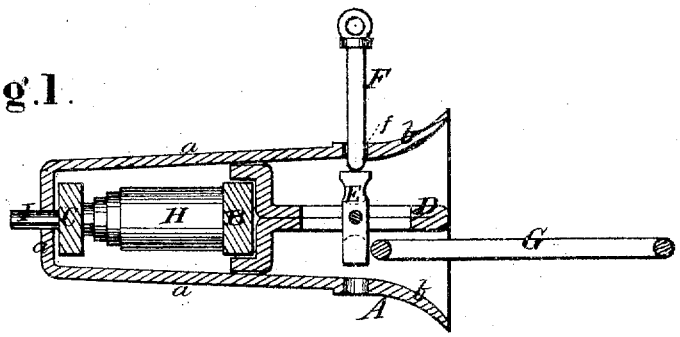
Figure 2:
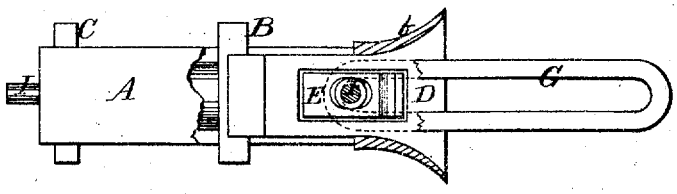

Figure 1 represents a vertical longitudinal section of my improved car-coupling. Fig. 2 represents a plan or top view, partly in section, of the same.

Similar letters of reference indicate corresponding parts.

This invention has relation to a new car-coupling, which is arranged to be automatic in its action, the pin being thrown down by the insertion of the link. The invention consists, mainly, in the use of a pivoted perforated plate, which is arranged within the draw-head, and hangs vertically when the cars are uncoupled, being designed to sustain the coupling-pin on its upper end.

In the accompanying drawing, the letter A represents the draw-head or coupling-box, made, usually, of a continuous strap, *a*, bent around the supporting beams C C, and having the mouth-piece *b*, as shown. Any other suitable construction may be adopted for the coupling-box. Within the bell-mouth, and about midway between its upper and lower walls, is fitted a horizontal partition, D, the use of which will be presently explained. E represents a tumbler, by means of which the coupling is effected when the link enters the draw-head. This tumbler or plate E is provided with journals, which rotate in suitable seats formed in or attached to the draw-head. The tumbler is slotted centrally, and is made heavier at one end than the other, so that it will hang vertically when it is free to move. Perpendicularly above the tumbler is an aperture, *f*, made in the draw-head, for the coupling-pin F, which, when the cars are uncoupled, is designed to be supported on the upper end of the tumbler-plate E. It is apparent that the partition D will prevent the inserted link from striking the tumbler between its journals, in which case it would not turn. When the coupling-link G is inserted in the box A, either above or below the partition D, it strikes against the upper or lower part of the plate, and swings the same into a horizontal position, thereby bringing the central slot or opening above referred to in line with the coupling-pin, so that the latter will drop and lock the link. When the pin is raised to uncouple, the plate E will resume its vertical position, and will then sustain the pin upon its upper end for the next coupling.

The action of this coupling is automatic, and it is adapted to couple cars of different heights, as the link will operate the tumbler, whether it enter the draw-head above or below the partition D. The beams B C are held apart by a spring, H, wound around a guide-rod, I, and serve, therefore, as cushions for the coupling.

I do not desire to confine myself to the precise construction herein described.

What I claim, and desire to secure by Letters Patent, is—

1. The combination, with a draw-head having a fender-plate, D, of the weighted tumbler E, perforated and pivoted to the draw-head, substantially as specified.

2. In combination with a draw-head, having an aperture, *f*, in its top, a weighted tumbler, perforated at or near its center, and pivoted to said draw-head by journals centrally located on each side of said perforated portion, substantially as specified.

3. The tumbler E, perforated centrally, weighted at one end and pivoted to the draw-head by journals centrally located on each side of said perforations, substantially as specified.

In testimony that I claim the above I have hereunto subscribed my name in the presence of two witnesses.

SOLON OWEN CAMPBELL.

Attest:

O. R. SMITH,

ALLEN B. PORCH.